United States Patent
Dzung

(10) Patent No.: US 10,574,489 B2
(45) Date of Patent: Feb. 25, 2020

(54) MATRIX EQUALIZER FOR CMFB TRANSMISSION IN DISPERSIVE CHANNELS

(71) Applicant: ABB Schweiz AG, Baden (CH)

(72) Inventor: Dacfey Dzung, Wettingen (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/055,310

(22) Filed: Aug. 6, 2018

(65) Prior Publication Data
US 2019/0036745 A1    Jan. 31, 2019

Related U.S. Application Data

(63) Continuation of application No. PCT/EP2017/052461, filed on Feb. 3, 2017.

(30) Foreign Application Priority Data

Feb. 4, 2016    (EP) ..................................... 16154331

(51) Int. Cl.
    *H03H 7/30*        (2006.01)
    *H04L 25/03*      (2006.01)
    *H04L 25/02*      (2006.01)

(52) U.S. Cl.
CPC .... *H04L 25/03159* (2013.01); *H04L 25/0212* (2013.01); *H04L 25/0228* (2013.01)

(58) Field of Classification Search
CPC ........... H04L 25/03159; H04L 25/0212; H04L 25/0228
See application file for complete search history.

(56) References Cited

U.S. PATENT DOCUMENTS

| | | | | |
|---|---|---|---|---|
| 6,069,917 A | * | 5/2000 | Werner | H04L 25/0307 375/232 |
| 2010/0183054 A1 | * | 7/2010 | Daly | H04L 25/03006 375/219 |
| 2013/0272364 A1 | * | 10/2013 | Zhang | H04L 25/022 375/231 |

(Continued)

OTHER PUBLICATIONS

European Patent Office, International Search Report & Written Opinion issued in corresponding Application No. PCT/EP2017/052461, dated Apr. 11, 2017, 15 pp.

(Continued)

*Primary Examiner* — Dhaval V Patel
(74) *Attorney, Agent, or Firm* — Taft Stettinius & Hollister LLP; J. Bruce Schelkopf

(57) ABSTRACT

The present invention is concerned with Cosine Modulated Filter Band modulation, in particular for a matrix equalizer for equalising a modulated signal carrying digital data, wherein the signal is modulated using a CMF6 and transmitted through a transmission channel having a channel impulse response c(t), wherein the matrix equalizer comprises: matrix coefficients W(i) determined based on the discrete-time matrix channel impulse response C(i) that is determined from the channel impulse response c(t); wherein the matrix equalizer is configured to equalize the modulated signal in order to reduce signal distortion introduced by the transmission channel. The present invention also concerns a method for equalising the CMFB modulated signal.

22 Claims, 11 Drawing Sheets

(56) References Cited

U.S. PATENT DOCUMENTS

2013/0279558 A1* 10/2013 Tang ................... H04L 27/2649
  375/232
2016/0329062 A1* 11/2016 Ekstrand ............... G10L 19/265

OTHER PUBLICATIONS

European Patent Office, Extended Search Report issued in corresponding Application No. 16154331.9, dated Jul. 18, 2016, 12 pp.
Farhang-Boroujeny, "Filter Bank Multicarrier Modulation: A Waveform Candidate for 5G and Beyond," Hindawi Publishing Corporation Advances in Electrical Engineering, vol. 2014, Dec. 21, 2014, pp. 1-25.
Ihalainen et al., "Channel Equalization for Multi-Antenna FBMC/OQAM Receivers," IEEE Transactions on Vehicular Technology, vol. 60, No. 5, Jun. 2011, pp. 2070-2085.

* cited by examiner

MATRIX EQUALIZER FOR CMFB TRANSMISSION IN DISPERSIVE CHANNELS

FIELD OF THE INVENTION

The present invention discloses a method for receiving a signal carrying digital data using matrix equalizer in order to reduce signal distortion introduced by the transmission channel. The present invention also relates to determination of the matrix equalizer.

BACKGROUND OF THE INVENTION

Cosine Modulated Filter Bank, CMFB modulation for digital data transmission offers high spectral containment, low overhead, and high flexibility in spectrum usage. However, it is sensitive to signal distortions introduced by the transmission channel.

The CMFB modulation is an improved version of Orthogonal Frequency Division Multiplex, OFDM modulation. Both modulation types support flexible spectrum usage. The advantages of CMFB over OFDM are (i) the better contained transmit spectrum, obtained by additional filtering, and (ii) the higher efficiency, since the cyclic prefix overhead of OFDM can be omitted. However, CMFB implementation has higher computational complexity, and CMFB reception is highly sensitive to signal distortions introduced by the communication channel. Hence, the channel equalization is needed at the CMFB receiver to mitigate the effect of signal distortion on transmission performance.

A simple CMFB equalizer uses the same principle as the well-known OFDM equalizer, i.e. known training signals are inserted by the transmitter, e.g. as packet preamble that are OFDM symbols with known modulation on all subcarriers, or as pilot tones that are known modulation on known subcarriers. The receiver uses the corresponding received signals to estimate the channel transfer function C(f) in the frequency domain, i.e. after demodulation. The equalizer is then simply W(f)=1/C (f), i.e. a simple complex one-tap multiplication per sub-channel f, see Behrouz Farhang-Boroujeny, "Multicarrier Modulation with blind Detection Capability using Cosine Modulated Filter Banks," IEEE Transactions on Communications, Vol. 51, No. 12, December 2003, pp. 2057-2070. This method suffices however only for transmission channels with short impulse responses and negligible inter-symbol interference, ISI. Also, in contrast to the OFDM case, the frequency domain channel estimation in CMFB is affected by the inherent inter-channel interference, ICI and thus converges only slowly.

Ihalainen et al., "Channel Equalization for Multi-Antenna FBMC/OQAM Receivers" addresses to the problem of channel equalization in filter bank multicarrier FBMC transmission based on the offset quadrature-amplitude modulation OQAM subcarrier modulation. Finite impulse response FIR per-subchannel equalizers are derived based on the frequency sampling FS approach, both for the single-input multiple-output SIMO receive diversity and the multiple-input multiple-output MIMO spatially multiplexed FBMC/OQAM systems. The FS design consists of computing the equalizer in the frequency domain at a number of frequency points within a subchannel bandwidth, and based on this, the coefficients of subcarrier-wise equalizers are derived. The paper evaluates the error rate performance and computational complexity of the proposed scheme for both antenna configurations and compare them with the SIMO/MIMO OFDM equalizers. The results obtained confirm the effectiveness of the proposed technique with channels that exhibit significant frequency selectivity at the subchannel level and show a performance comparable with the optimum minimum mean-square-error equalizer, despite a significantly lower computational complexity.

DESCRIPTION OF THE INVENTION

It is therefore an objective of the invention to reduce or compensate distortion of CMFB signals introduced by the communication channel, i.e. the transmission channel. The present invention enables an optimum in a well-defined sense and makes use of efficient polyphase implementations of CMFB receivers.

These objectives can for example be advantageous for data communication over the powerline. This objective is achieved by a method and a device according to the independent claims. Preferred embodiments are evident from the dependent patent claims.

The present invention provides a method for receiving a signal carrying digital data by a receiver, wherein the signal is modulated using a Cosine Modulated Filter Bank CMFB at a sender and transmitted through a transmission channel having a channel impulse response c(t), comprising the steps of: a) determining or obtaining the channel impulse response c(t) in time domain, where determining means estimating or calculating, b) determining a discrete-time matrix channel impulse response C(i) from the channel impulse response C(t); c) determining matrix coefficients W(i) based on a linear system of equations using the discrete-time matrix channel impulse response c(i) and statistical parameters of the digital signal; and d) equalizing the signal at the receiver using the matrix coefficients W(i) in order to reduce signal distortion introduced by the transmission channel. The discrete-time matrix channel impulse response C(i) can be obtained or determined by mapping the channel impulse response c(t) to it. The discrete-time matrix channel impulse response C(i) represents the effect of the channel impulse response c(t) on the CMFB modulated signal. The matrix coefficients are used to define the equalizer in step d).

According to another aspect, the present invention also provides a matrix equalizer at a receiver for equalising a modulated signal carrying digital data, wherein the signal is modulated using a Cosine Modulated Filter Bank CMFB at a sender and transmitted through a transmission channel having a channel impulse response c(t), wherein the matrix equalizer has matrix coefficients W(i) determined based on the discrete-time matrix discrete-time matrix channel impulse response C(i) that is determined from the channel impulse response c(t). In particular, the matrix coefficients W(i) is determined based on a linear system of equations using the discrete-time matrix channel impulse response C(i) and statistical parameters of the digital signal. The matrix equalizer is configured to: determine the matrix channel impulse response c(t) in the time domain, determining or obtaining a discrete-time matrix channel impulse response C(i) from the channel impulse response c(t) by mapping the channel impulse response c(t) to the discrete-time matrix channel impulse response C(i), determine matrix coefficients W(i) based on a linear system of equations using the discrete-time matrix channel impulse response C(i) and statistical parameters of the digital signal, and to equalize the modulated signal using the matrix coefficients W(i) in order to reduce signal distortion introduced by the transmission channel.

According to an exemplary embodiment of the present invention, the method further comprising the step of: e)

demapping the digital data from of the equalized signal. This step can be used for extracting the digital data from the equalized signal and may be performed by demapping the digital data from a vector of complex-valued samples of the equalized signal.

According to an exemplary embodiment of the present invention, the matrix equalizer is linear and structured as:

$$\hat{s}(m - m_0) = \sum_{i=0}^{L_W-1} W(i) y(m - i) \quad (1)$$

where the vector $\hat{s}$ contains the samples of the m sub-channels of the equalizer, m is the count of the CMFB symbols, $m_0$ is delay of the equalizing step c), $L_w$ is number of matrix coefficients W(i), and wherein the matrix coefficients W(i) have a dimension of M×M and depend on the channel impulse response c(t) and CMFB modulation parameters. Note, y is the vector of samples at the input to the equalizer and $\hat{s}$ is the vector of samples at the output of the equalizer, see FIG. 1.

In particular, the vector $\hat{s}$ and y may contain the complex-valued samples of the M sub-channels of the CMFB modulation, at the positions marked "s" and "y" in FIG. 1.

According to an exemplary embodiment of the present invention, the modulated signal using the CMFB can be represented as follows:

$$y(m) = \sum_{i=0}^{L_c-1} C(i) s(m - i) + n(m) \quad (2)$$

where y(m) is the CMFB output vectors sequence, the vector s(m) contains data-modulated samples of M sub-channels of the CMFB modulation, n(m) is a vector of noise samples, and m is the count of CMFB symbols.

In other words as above explained, in order to implement this equalizer or equalization of the modulated signal, specifically to determine its matrix coefficients W(i), the following steps can be summaries as:

The sampled channel impulse response, CIR c(t) is estimated in the time domain, e.g. using a pseudo-random training signal.
  Given the estimated CIR c(t), a discrete-time matrix-valued impulse response C(i) of CMFB transmission through the channel is determined, by feeding c(t) to the CMFB receiver. The resulting filter bank output vectors are mapped to the desired matrices C(i).
  The matrix model C(i), together with statistical parameters on the signals, is used to set up a linear system of equations. Its solution yields the matrix coefficients W(i) of the linear equalizer shown in FIG. 1.
  During CMFB data transmission, equalization is performed using the matrix equalizer in FIG. 1. The real part of the equalizer output is used by conventional PAM detectors to recover the transmitted bits.

According to an exemplary embodiment of the present invention, the method further comprises the step of: creating a linear system of equations using the discrete-time matrix channel impulse response and statistical parameters of the digital signal for determining the matrix coefficients.

According to the present invention, estimating CIR in time domain requires fewer training signals, i.e. less overhead, than estimating the channel in frequency domain, when used for CMFB equalization.

According to an exemplary embodiment of the present invention, the matrix coefficients W(i) obtained in step b2) are calculated according to:

$$\Sigma_{i=0}^{L_W-1} W(i) R_{yy}(l-i) = R_{sy}(l-m_0), \, l=0 \ldots L_W-1 \quad (3)$$

where $R_{yy}(\,)$ are correlation matrices of the CMFB output vectors sequence y(m), and $R_{sy}(\,)$ are the cross-correlation matrices between vector sequences y and S. Thus, C(i) and W(i) are in form of matrices and w(i) are coefficients for the matrix equalizer. Further, $R_{yy}$ and $R_{sy}$ can be pre-calculated from the discrete-time matrix channel impulse response C(i) and the signal statistics.

According to an exemplary embodiment of the present invention, step c) is performed using a predefined excitation signal including multiple time domain transmission signals $x^{(r)}(t)$. This is described later in more detail, e.g. equation (4) and FIG. 8.

According to an exemplary embodiment of the present invention, the method further comprises the step of: (i) performing convolution of the predefined excitation signal with the channel impulse response c(t), (ii) feeding the convolution signals to an implementation of a CMFB at the receiver, and (iii) mapping the CMFB output vectors y(m) to the matrix coefficients W(i) of the discrete-time matrix channel impulse response, wherein the implementation is a polyphase implementation.

According to an exemplary embodiment of the present invention the steps a) to c) are performed in a training state, while the steps d) and e) are performed in a steady-state during the transmission of the signal.

The present invention also relates to a computer program product including computer program code for controlling one or more processors of a device adapted to be connected to a communication network and/or configured to store a standardized configuration representation, particularly, a computer program product including a computer readable medium containing therein the computer program code.

BRIEF DESCRIPTION OF THE DRAWINGS

The subject matter of the invention will be explained in more detail in the following text with reference to preferred exemplary embodiments which are illustrated in the attached drawings, in which:

FIG. 2a shows the CMFB transmitter and channel model, k=0 . . . M−1, and FIG. 2b shows the complex CMFB receiver with frequency domain equalizer, FEQ;

FIG. 3a shows a real valued CMFB transmitter using fast DCT, where $\Delta_c = (-1)^{mN/4} I$ is a diagonal sign adjustment matrix, I is the identity matrix, j is an anti-diagonal matrix reversing the order of the input components; FIG. 3b shows a complex CMFB receiver using fast DFT (FFT), where FEQ is a scalar frequency domain equalizer, and $d_k = e^{j\theta_k} W_{2M}^{(k+0.5)N/2}$ are phase correction factors;

FIG. 4a shows the spectra of an OFDM transmission, where $H(f)=\sin(\pi f T)/$ ($\pi$fT), while FIG. 4b shows the spectra of a CMFB transmission, where H(f) is a square-root Nyquist filter with $|H(\pm 1/4T)|^2 = 1/2$.

FIG. 5a shows a transmit power spectral density PSD, while FIG. 5b shows the PSD at the receiver, after distortion by a transmission channel with CIR c(t), and AWGN, where $c(t)=\delta(t)-0.4\delta(t-9)+0.2\delta(t-230)$;

FIG. 6a shows a distortionless case $c(t)=\delta(t)$ while FIG. 6b shows the distortion by a transmission channel, where c(t) as in FIGS. 5a-5b;

FIGS. 7a and 7b show the real part $\mathcal{R}\{y^{(0)}(m)\}$, FIGS. 7c and 7d show the imaginary part $\mathcal{I}\{y^{(0)}(m)\}$. FIGS. 7a and 7c show the distortionless case $c(t)=\delta(t)$, and FIGS. 7b and 7d show the distortion by transmission channel, where c(t) as in FIGS. 5a-5b, $M_A$=288 active subchannels as in FIGS. 5a-5b.

The reference symbols used in the drawings, and their primary meanings, are listed in summary form in the list of designations. In principle, identical parts are provided with the same reference symbols in the figures.

DETAILED DESCRIPTION OF EXEMPLARY EMBODIMENTS

Figure 1:
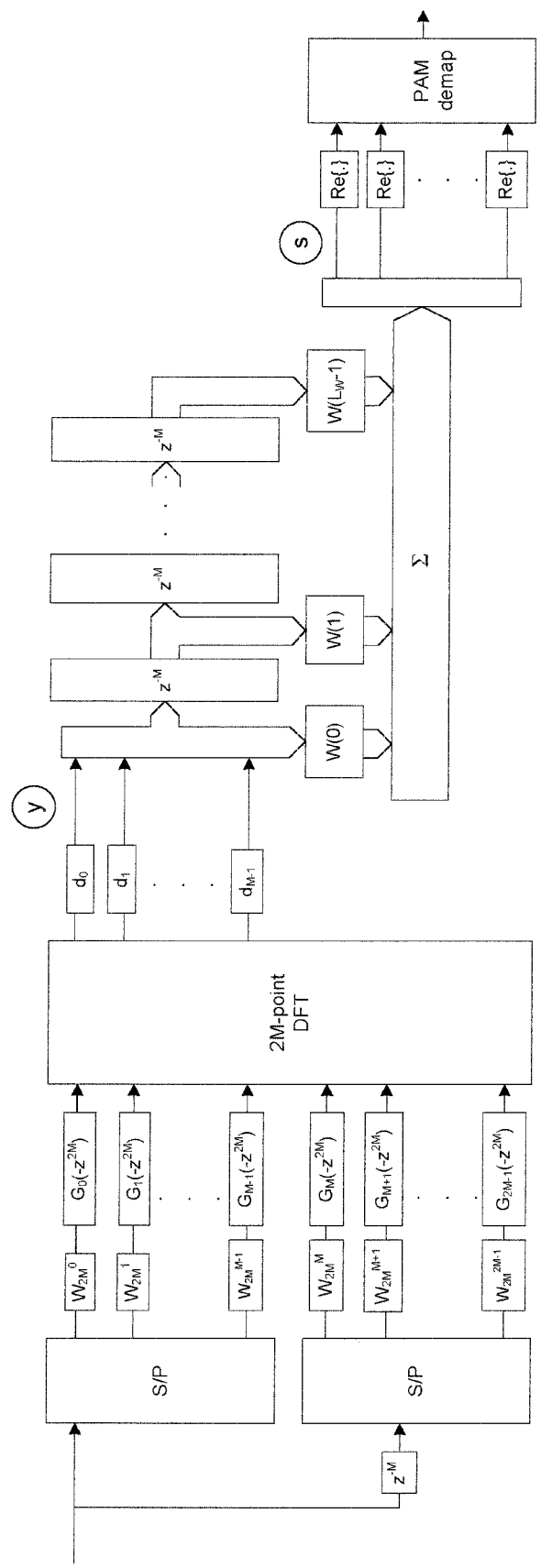
FIG. 1 schematically shows a CMFB receiver with matrix equalizer according to the present invention.

FIG. 1 shows the CMFB receiver with matrix equalizer according to the present invention, where the matrix equalizer is structured as equation (1) as explained before and arranged between the positions "y" and "s". In order to implement the equalizer, the present invention explains now the steps in more details.

At first the channel impulse response CIR c(t) in the time domain will be estimated by using training signals. The standard least squares method is described in detail in a later section B. The training signal should be as wide band as possible and is typically generated using pseudo-random data modulation of the active subcarriers.

Now the matrix channel impulse response c(i) can be determined. The impulse response matrices C(i) describe the effect of the channel c(t) on each of the M subchannels, i.e. the intersymbol interferences ISI and the interchannel interferences ICI due to the distortion by c(t), see Representation (2). The number of $L_C M^2$ elements in C(i) is large, it is thus important to find efficient methods to determine these elements. The following describes such as method. It is based on the detailed model of CMFB transceivers and their interaction with the channel c(t), as explained later in section A. According to the model, the sampled output $y(m)=[y_o(m), \ldots y_{M-1}(m)]'$ of the CMFB receiver filter bank, at position 'y' in FIG. 1, is described by Representation (2), where $s(m)=[s_o(m), \ldots, s_{M-1}(m)]'$ is the vector of M real-valued data-bearing PAM symbols at the CMFB transmitter (see FIG. 3a), C(i), i=0 . . . $L_C$-1, are M×M complex matrix coefficients, and n(m) is the sampled noise vector. Representation (2) of CMFB transmission is the key and novel insight, as it suggests the application of known principles for the derivation of equalizers, properly generalized to complex matrix-valued form.

Given the estimated CIR c(t), the following method according to the present invention can be used to determine the matrices C(i) efficiently. It takes advantage of the fact that C(i) are band matrices, since ICI is limited to the adjacent channels only, according to the analysis leading to (A.20) below. This allows to determine the ISI and ICI components in parallel for subchannels k=r,r+3,r+6,r+9, . . . Select as input s(m) the three vector sequences $$s^{(0)}(m) = \begin{bmatrix} \begin{bmatrix} 1 \\ 0 \end{bmatrix} \\ \begin{bmatrix} 0 \\ 1 \\ 0 \end{bmatrix} \\ \begin{bmatrix} 0 \\ 1 \\ 0 \end{bmatrix} \\ \vdots \end{bmatrix} \delta(m), \quad s^{(1)}(m) = \begin{bmatrix} \begin{bmatrix} 0 \\ 1 \end{bmatrix} \\ \begin{bmatrix} 0 \\ 1 \\ 0 \end{bmatrix} \\ \begin{bmatrix} 0 \\ 1 \\ 0 \end{bmatrix} \\ \vdots \end{bmatrix} \delta(m), \quad (4)$$

$$s^{(2)}(m) = \begin{bmatrix} [0] \\ \begin{bmatrix} 0 \\ 1 \\ 0 \end{bmatrix} \\ \begin{bmatrix} 0 \\ 1 \\ 0 \end{bmatrix} \\ \vdots \end{bmatrix} \delta(m).$$

According to (2), the corresponding output of the CMFB receiver, including the distortion due to the channel c(t), are three sequences of M-dimensional vectors $$y^{(0)}(m) = \begin{bmatrix} \begin{bmatrix} C_0(m) \\ \overline{C}_0(m) \end{bmatrix} \\ \begin{bmatrix} C_3(m) \\ C_3(m) \\ \overline{C}_3(m) \end{bmatrix} \\ \begin{bmatrix} C_6(m) \\ C_6(m) \\ \overline{C}_6(m) \end{bmatrix} \\ \vdots \end{bmatrix}, \quad y^{(1)}(m) = \begin{bmatrix} \begin{bmatrix} C_1(m) \\ C_1(m) \\ \overline{C}_1(m) \end{bmatrix} \\ \begin{bmatrix} C_4(m) \\ C_4(m) \\ \overline{C}_4(m) \end{bmatrix} \\ \begin{bmatrix} C_7(m) \\ C_7(m) \\ \overline{C}_7(m) \end{bmatrix} \\ \vdots \end{bmatrix}, \quad (5)$$

$$y^{(2)}(m) = \begin{bmatrix} [0] \\ \begin{bmatrix} C_2(m) \\ C_2(m) \\ \overline{C}_2(m) \end{bmatrix} \\ \begin{bmatrix} C_5(m) \\ C_5(m) \\ \overline{C}_5(m) \end{bmatrix} \\ \vdots \end{bmatrix}, m = 0 \ldots L_c - 1,$$

where their length $L_C$ is chosen such that the main part of the CIR is included, i.e. $y^{(r)}(L_C)$ becomes negligible. With the choice of (4) as input sequence, (5) follows since an input in subchannel k causes only outputs in the subchannels k−1, k, and k+1, according to (A.20). Hence, the components in $y^{(r)}(m)$ do not contain unwanted superpositions. Hence, the elements obtained in (5) can be directly mapped to the desired M×M matrices $$C(i) = \begin{bmatrix} C_0(i) & \underline{C}_1(i) & & & & & \\ \overline{C}_0(i) & C_1(i) & \underline{C}_2(i) & & & & \\ & \overline{C}_1(i) & C_2(i) & \underline{C}_3(i) & & & \\ & & \overline{C}_2(i) & C_3(i) & \underline{C}_4(i) & & \\ & & & \overline{C}_3(i) & C_4(i) & \underline{C}_5(i) & \\ & & & & \overline{C}_4(i) & C_5(i) & \ddots \\ & & & & & \overline{C}_5(i) & \ddots \\ & & & & & & \ddots \end{bmatrix}, \quad (6)$$

$$i = 0 \ldots L_c - 1,$$

As noted, matrices C(i) are complex-valued and have a diagonal band structure, with non-zero entries only in the diagonal and adjacent positions. FIGS. 7a-7d shows an example of a vector sequence $y^{(0)}(m)$.

Figure 8:
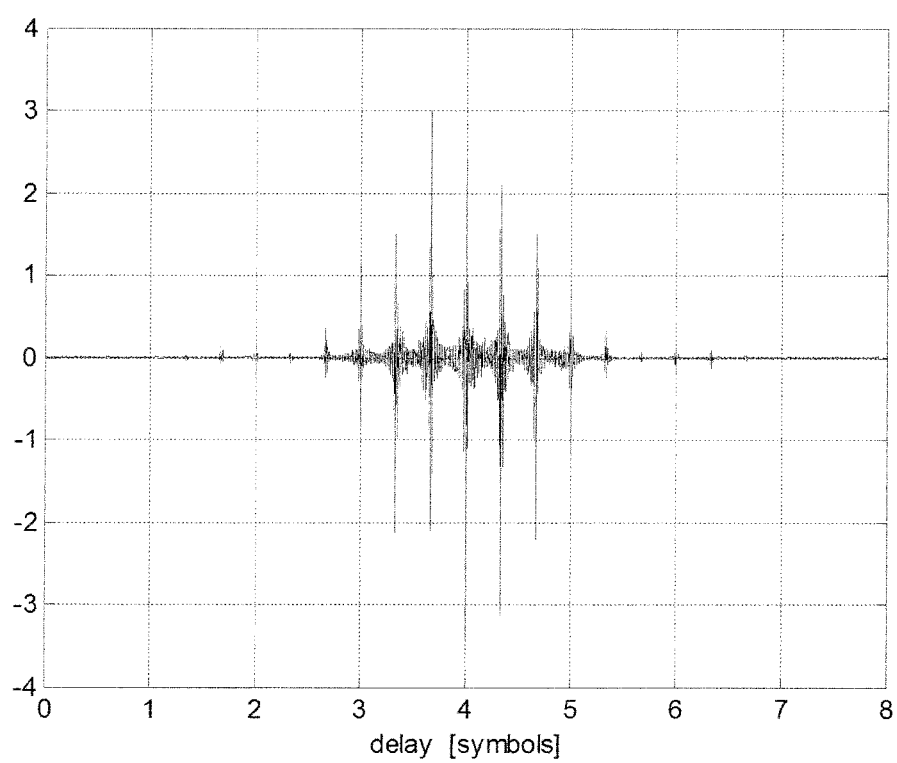
FIG. 8 schematically shows the input signal $x^{(0)}(t)$ to generate CMFB impulse responses of FIGS. 7a-7b.

The present invention further introduces an efficient calculation of matrix channel impulse response c(i). In particular, the efficient way to obtain (5) is as follows: using $s^{(r)}(m), r=0,1,2$ in (4) as input to the efficient digital polyphase implementation of the CMFB transmitter, see FIG. 3a. The resulting three time domain transmission signals $x^{(r)}(t)$, e.g. sampled at rate $f_s=1/T_s$, are precalculated vectors to be stored in the receiver. The time domain transmission signals can be combined into a bundle as the predefined excitation signal. FIG. 8 shows $x^{(0)}(t)$ used to generate the example $y^{(0)}(m)$ of FIGS. 7a-7d.

Once the CIR c(t) is known from the step of time domain estimation, the receiver calculates the three convolutions c(t) $x^{(r)}(t)$, and feeds these signals to the efficient polyphase implementation of the CMFB receiver. The corresponding output vectors obtained at position 'y' of FIG. 1 are the desired $y^{(r)}(m)$ of (5), to be mapped to C(i).

The next step is to determine the Matrix equalizer coefficients W(i). Given the channel coefficients C(i), the calculation of Minimum Mean Square Error, MMSE, linear equalizer coefficients is well-known for the real-valued scalar case. The extension to the complex matrix case is in principle straightforward: Given C(i), the linear system of equations (3) explained before can be set up, where $R_{yy}(\cdot)$ and $R_{sy}(\cdot)$ are correlation matrices which can be calculated from C(i). The numerical solution of (3) yields the $L_W$ required M×M matrix coefficients W(i) of the MMSE optimum linear matrix equalizer (1) of the invention. More details are given in section C later on.

The number $L_W$ of matrix coefficients, and the equalization delay $m_o$ are parameters to be chosen. The choice of the equalizer length $L_W$ must be made as compromise between equalizer performance and its computational complexity. The inherent equalization delay $m_o$ is typically equal to the prototype filter length $m_N$, see for example FIGS. 6a-6b.

Once the matrix coefficients are determined, the actual equalization of the data-bearing CMFB signals are performed by the matrix equalizer (1) shown in FIG. 1. There are $L_W$ M×M matrix coefficients, hence there are $O(L_w M^2)$ operations to be performed per CMFB symbol. The real parts of the M equalizer output components $\Im\{\hat{s}_k(m)\}$, at position 's' in FIG. 1, are fed to the PAM detectors to recover the transmitted bits in the subchannels.

Exemplary Embodiments

As an exemplary embodiment of the present invention, the matrix $L_W$ coefficients W(i) have size M×M. With M 32 512 or 4096, this implies high computational complexity of the matrix equalizer. Simplifications to reduce complexity are thus of interest. The following simplifications constitute the exemplary embodiment of the present invention:

Approximate the effect of the channel by using only length $L_C=1$ for the discrete matrix channel model. Then, the equalizer length becomes also $L_W=1$, and the solution of (3) reduces to $W(0)=C(0)^{-1}$. This simple matrix equalizer compensates for amplitude and phase distortion and ICI. The inverse of the band matrix C(0) is in general a full M×M matrix, but it may be possible to approximate it by a band matrix to reduce computation. In the extreme case, C(0) is further approximated by a complex diagonal matrix, whose inverse $W(0)=C(0)^{-1}$ is again diagonal. This special case corresponds to the known scalar frequency domain equalizer (FEQ) W(f)=1/C(f), see FIG. 3b, which equalizes only amplitude and phase distortion, but neither ICI nor ISI.

To reduce computations to obtain C(i), it may be sufficient to use only one, instead of three, input signal $x^{(r)}(t)$ to obtain say $y^{(0)}(m)$. The components in $y^{(1)}(m)$ and $y^{(2)}(m)$ corresponding to subchannels k+1, k+2, can be obtained from $y^{(0)}(m)$ by interpolation between subchannels k and k+3. This 3Δf-spaced interpolation in the frequency domain is lossless if the channel transfer function C(f) is sufficiently smooth. By the Nyquist criterion, using Δf=1/2T, this requires that the CIR length is less than T/3.

The solution (3) delivers the MMSE optimum linear equalizer of the form (1). For "circularly symmetric" and stationary random sequences s(·) and n(·), (1) is indeed the optimum form. However for CMFB the sequence s(·) is a real-valued PAM signal, i.e. not circularly symmetric. Hence a linear equalizer of the most general form $\hat{s}=\Sigma W(i)y(m-i)+\Sigma V(i)y^*(m-i)$ may have improved performance. This form constitutes a separate embodiment of the present invention. However, such an equalizer has essentially double the complexity of (C.2) in section C, while the performance improvement will be small in practice.

Given the representation (2), it is in principle straightforward to derive Maximum Likelihood Sequence Estimation MLSE algorithms for equalization, using the known concepts. These algorithms, also known as Viterbi algorithms, search recursively for bit sequences which match the received signal most closely in the ML sense. A full MLSE algorithm has however very high complexity due to the required search through all possible bit combinations. Reduced MLSE algorithms, in combination with simplified versions of the linear matrix equalizer described above as the main embodiment, constitute further embodiments of the present invention.

Figure 3A:
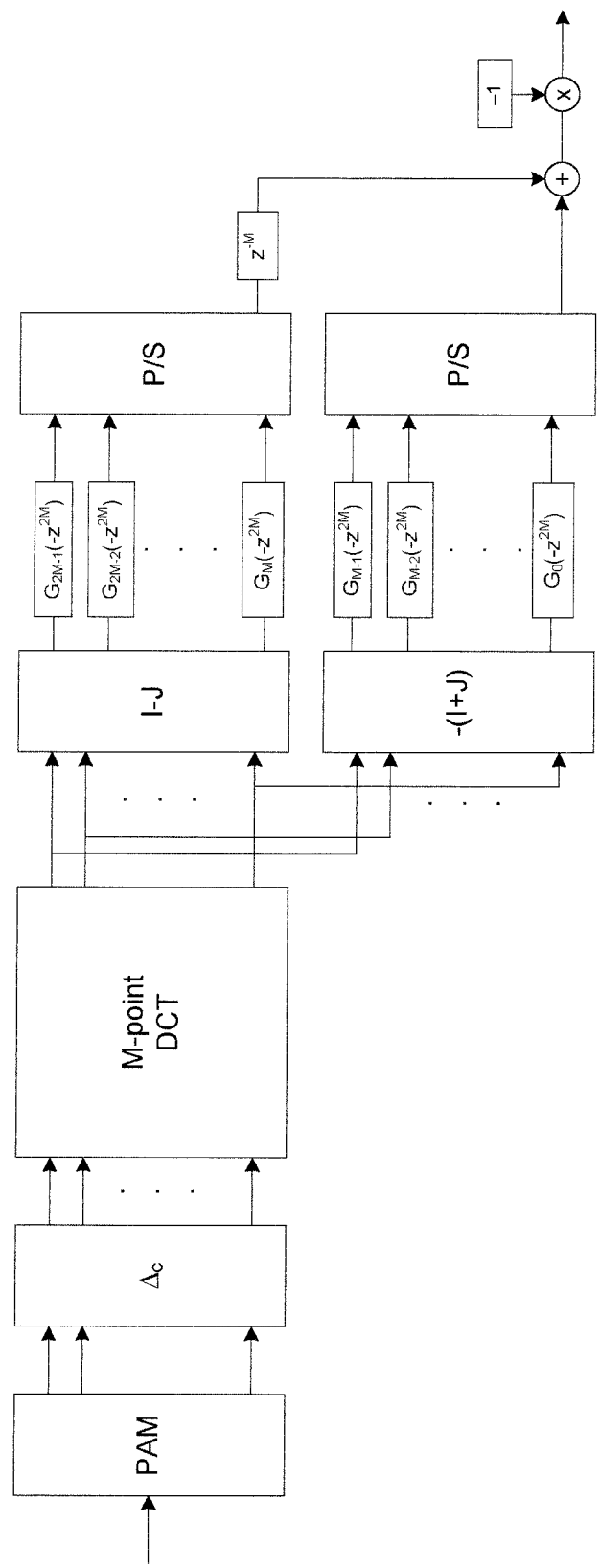
FIGS. 3a-3b schematically shows an efficient polyphase Filter Bank implementation of digital CMFB transceiver, where $W_{2M} = e^{j\pi/M}$; in particular.
Figure 3B:
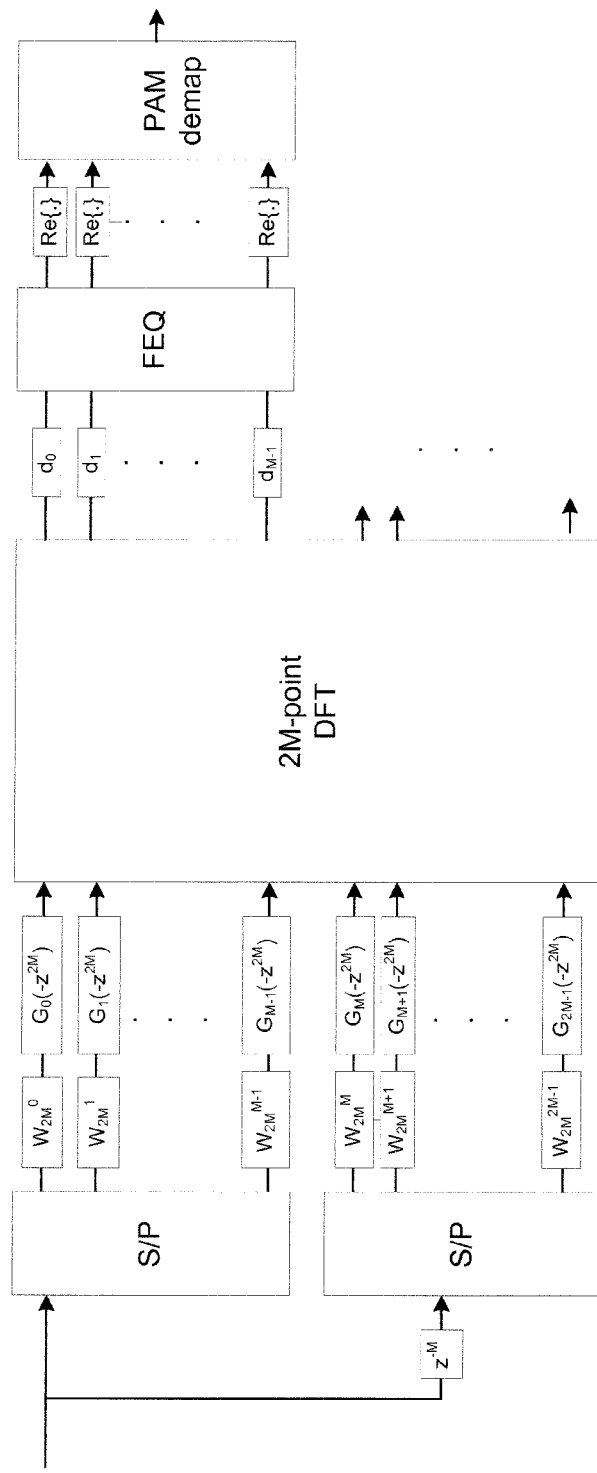

The equalizer according to the present invention is a non-trivial extension of the known scalar frequency domain equalizer FEQ, as can be seen by comparing FIG. 1 with FIG. 3b. It is the optimum linear equalizer in the MMSE sense. It equalizes both ISI and ICI, and has thus improved performance compared to known equalizers. In particular, constructive use of ICI is equivalent to optimum combining of multiple receiver subchannels for a given PAM symbol, thus improving bit error rate BER performance vs SNR.

The equalization according to this invention allows to employ CMFB transmission with improved transmitter spectrum also in highly dispersive channels. Such channels are expected e.g. for long distance broadband powerline communications on HV transmission lines.

Thereinafter, the present invention explains further the derivation of the methods according to the present invention in more detail.

A. CMFB Transceiver

Figure 2A:
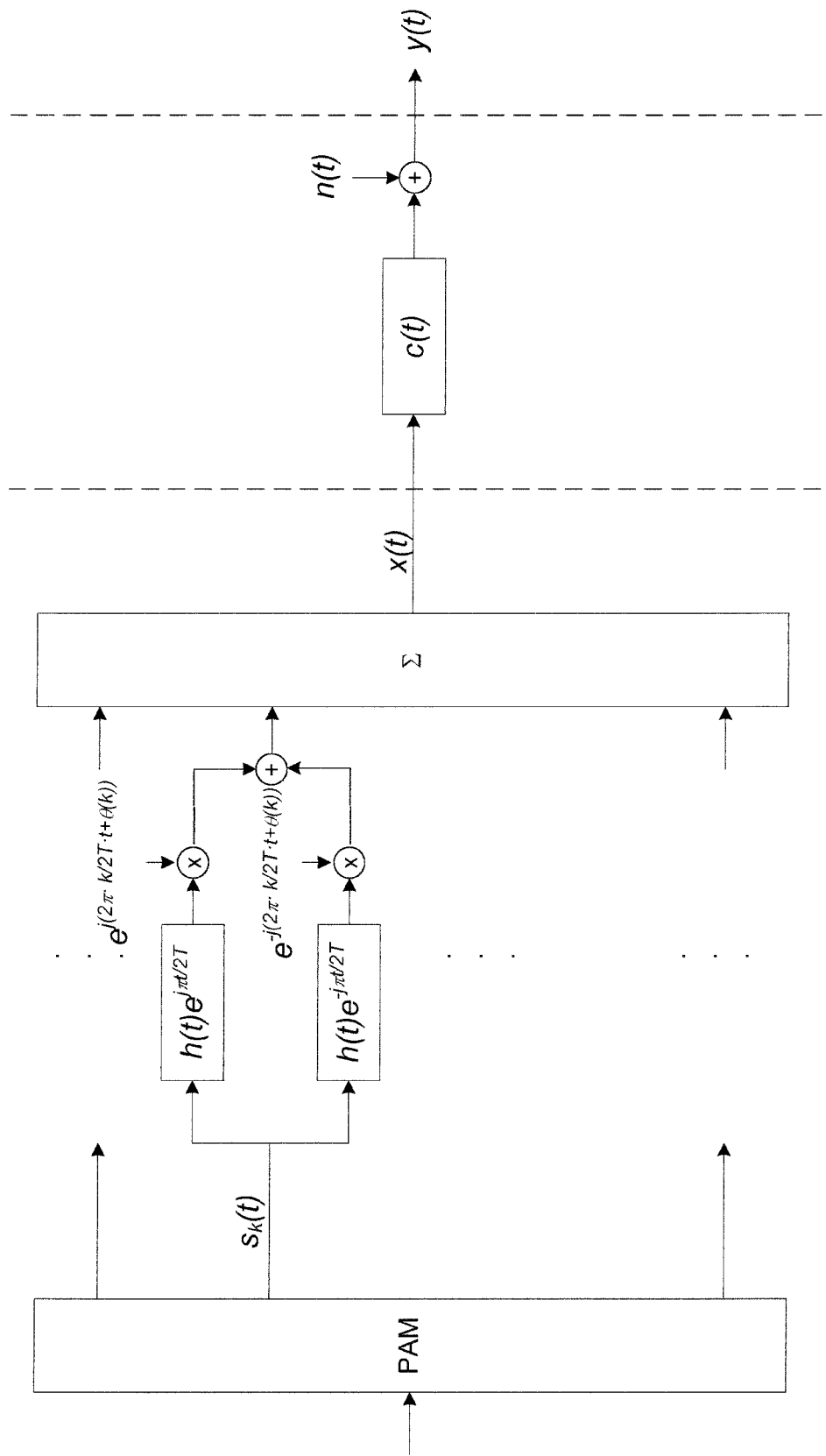
FIGS. 2a-2b schematically shows a continuous time representation of the CMFB transmission, in particular.
Figure 2B:
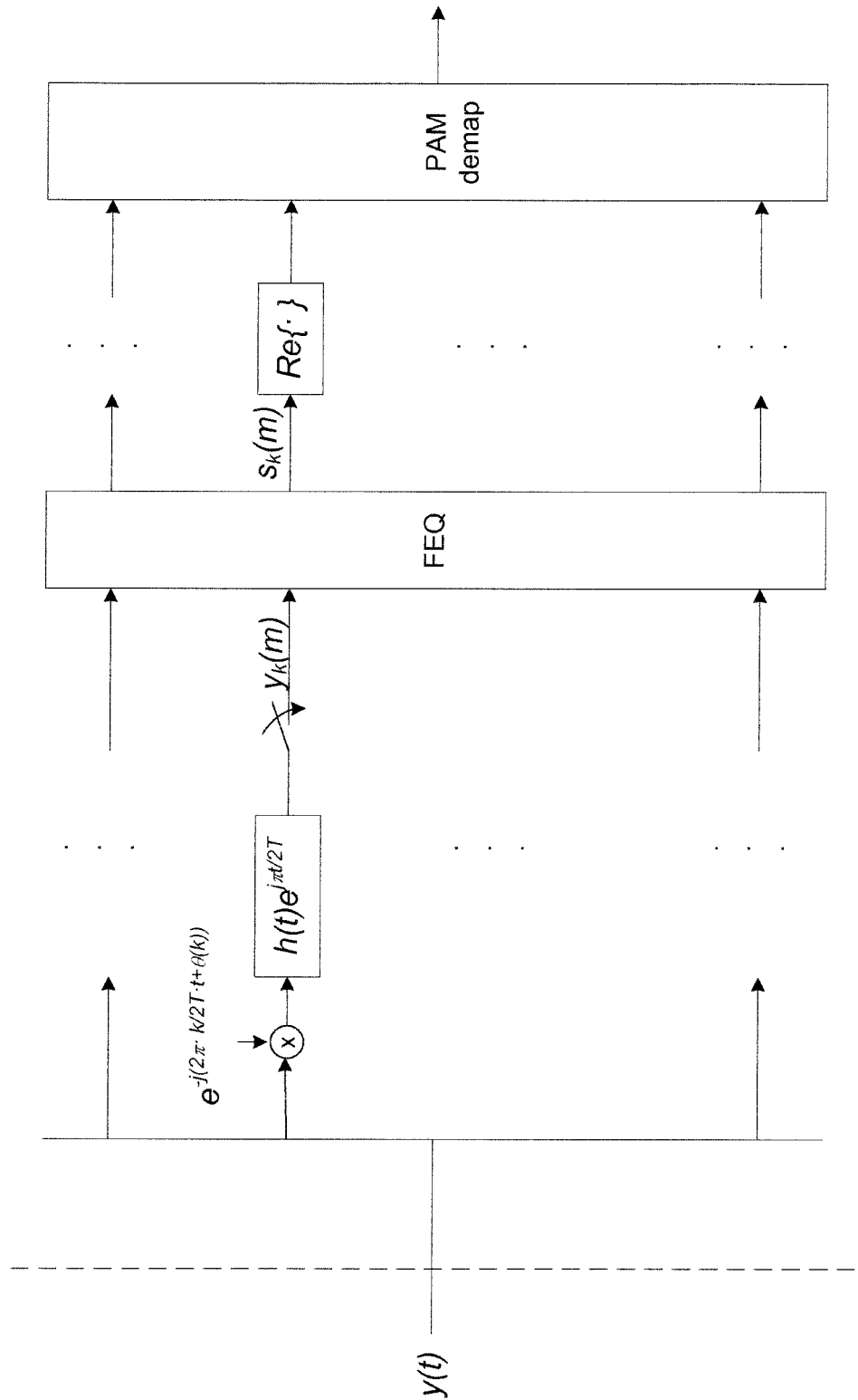

FIGS. 2a-2b shows the continuous time model of CMFB transmission. There are M subcarriers. The input to the k-th subchannel is a PAM signal $$s_k(t)=\Sigma_m s_k(m)\delta(t-mT), k=0 \ldots M-1 \quad (A.1)$$

where $s_k$ (m) is a L-level PAM sequence, with a symbol spacing of T. The signal $s_k(t)$ is filtered by a low-pass filter h(t) and then modulated to the k-th subcarrier at frequency $$f_k = \frac{1}{4T} + k\frac{1}{2T}. \quad (A.2)$$

It is seen that the subcarriers are spaced by $\Delta f=1/2T$. The common low-pass prototype filter h(t) is thus designed to have a nominal bandwidth of 1/2T, see FIGS. 4a-4b. The reason for the additional frequency shift by 1/4T in (A.2), and the phase shifts $\theta_k$ in the modulators, will become clear below.

Since $s_k$ (m) and h(t) are real-valued, the use of pairs of complex-conjugate modulators shown in FIG. 1 results in a cosine-modulated real-valued signal. M such cosine-modulated subchannel signals are then summed. The transmit power spectrum, assuming uncorrelated PAM signals, is the sum of M parallel power spectra, each with a nominal bandwidth of 1/2T. This baseband signal hence occupies the frequency band from 0 to M/2T.

CMFB and OFDM have the flexibility to select the actual frequency bands, by activating only an appropriate subset of $M_A$ out the maximum M subcarriers, see for example FIGS. The following description assumes $M_A=M$ for simplicity, the modifications for the case $M_A<M$ are trivial.

Figure 4A:
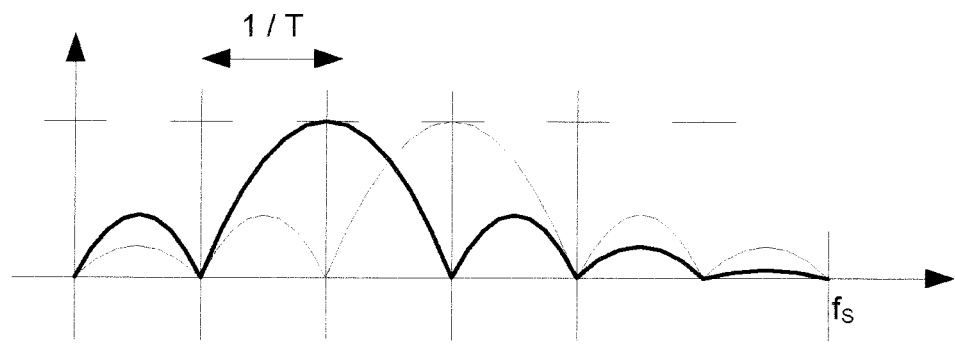
FIGS. 4a-4b schematically shows the transmit spectra by superposition of sub-channels; in particular
Figure 4B:
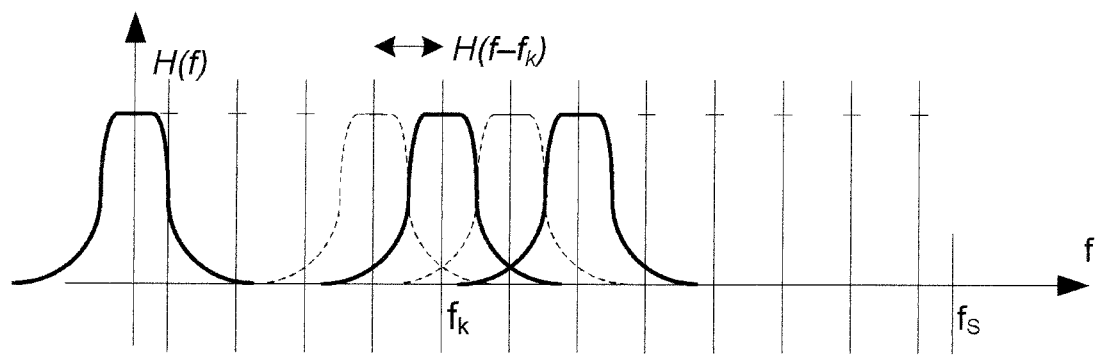
Figure 5A:
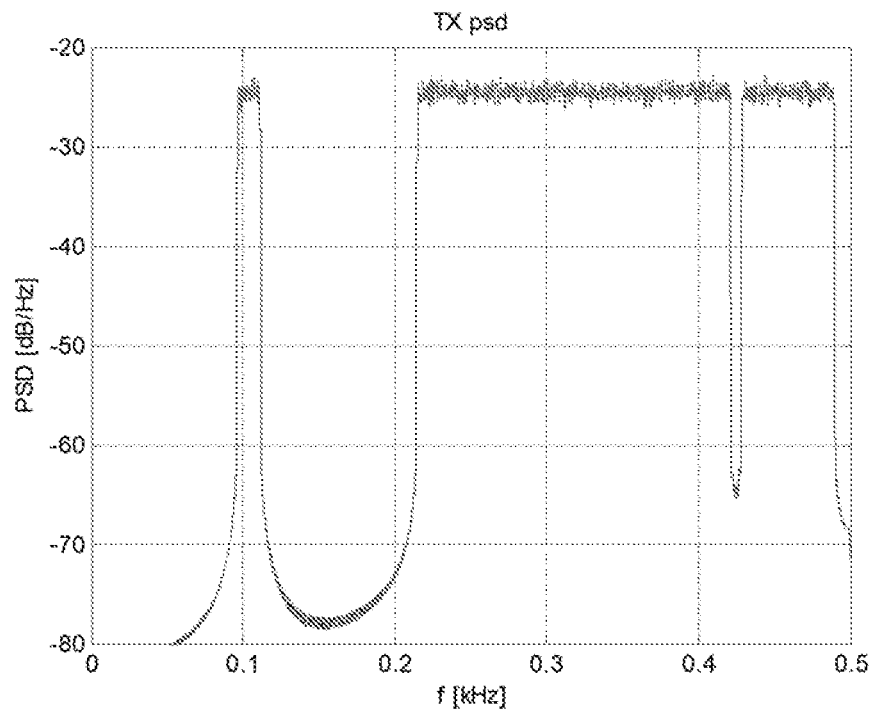
FIGS. 5a-5b schematically shows the CMFB spectra example using random data, where the CMFB parameters: M=512, $f_s$=1 kHz, prototype filter length $m_N M$=8.512, $M_A$=288 active sub-channels, selected to use the allocated frequency bands; in particular.
Figure 5B:
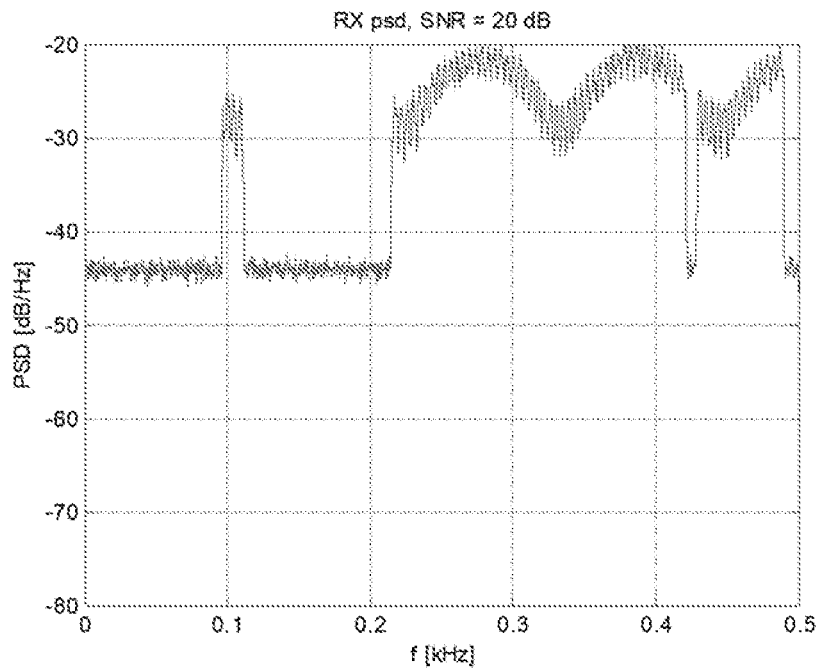

The CMFB in comparison with OFDM can be explained as follows: in the standard FFT-based OFDM, $f_k=k/T$, $\Delta f=1/T$, and the filter h(t) is a simple rectangular filter of length T, namely the DFT window, such that the subcarriers spaced $\Delta f=1/T$ are orthogonal. In contrast, CMFB subcarrier spacing is halved, resulting in double subcarrier density, as shown in FIGS. 4a-4b. However, CMFB subcarriers are real-valued PAM cosine-modulated, while OFDM subcarriers are complex QAM-modulated. Hence, the bit rate per bandwidth, e.g. b/s/Hz, is the same for both modulation types. Thus, the advantage of CMFB is the additional flexibility in designing a low-pass h(t) to contain the transmitted spectrum.

The present invention considers an efficient digital implementation of the CMFB transmitter as shown in FIG. 1. The sampling rate $f_S$ is chosen such that the number of samples per CMFB symbol is M, i.e. equal to the maximum number of subchannels, $$f_S = \frac{1}{T_S}, \text{ with } T = MT_S. \quad (A.3)$$

The highest subcarrier frequency is then $M/2T=f_S/2$, as required by the Nyquist criterion for real-valued sampled signals. Assume an FIR prototype low-pass filter h(t) of length N samples. Typically, $N=m_N M-1$, where $m_N=4$ or 8.

Direct implementation of the transmitter in FIG. 1 would then require some MN operations for the M parallel filters, plus further KM operations for the modulation to $f_k$ and the summing of M signals, i.e. in total about $m_N M^2+\kappa M$ operations for every CMFB symbol.

This complexity can be reduced by a factor of M by taking advantage of the fact that $s_k$ (t) is non-zero only every M-th sample, according to (A.1). Hence M-1 multiplications can be omitted. Using a polyphase decomposition of the filter h(t) allows to derive an efficient digital implementation of the CMFB transmitter. The resulting polyphase structure is shown in FIGS. 3a-3b, where $G_k(z)$, $k=0 \ldots 2M-1$, are the 2M polyphase components of h(t), i.e.

$$H(z)=\Sigma_{k=0}^{2M-1} z^{-k} G_k(z^{2M}). \quad (A.4)$$

For every CMFB symbol, the PAM block maps the input bits into M PAM amplitudes $s_k$, $k=0 \ldots M-1$. Then, the M-point Discrete Cosine Transform (DCT) performs modulation to the frequencies given by (A.2). This motivates the choice of subcarrier frequencies $f_k$ according to (A.2).—The DCT can be efficiently implemented by an 2M-point FFT, using some $2M \log_2 (2M)$ operations. The DCT output is filtered componentwise by a filter bank of the 2M FIR filters $G_k(-z^{2M})$, where the argument $z^M$ indicates that the filters operate at the rate $f_S/M=1/T$. These filters have $m_N$ coefficients each. The 2M parallel outputs of the filter bank are then converted to M serial time domain samples using a polyphase superposition. Hence, the total number of operations per CMFB symbol is reduced to about $(2 \log_2(2M)+2m_N)M$ operations, i.e. reduced by a factor of M, where M is typically a large number, e.g. M=512 or 4096.

The prototype filter h(t) is a low-pass filter with bandwidth 1/2T, designed for intersymbol interference-free transmission at a symbol rate of 1/2T. However, the actual symbol rate is twice, i.e. 1/T according to (A.1). This would lead to interference between adjacent symbols and subchannels at the CMFB receiver. To suppress intersymbol interference ISI between successive PAM symbols $s_k(m)$ and $s_k(m-1)$ in a given subchannel k, h(t) should ssatisfy certain time domain criteria. A sufficient choice is to design h(t) as a symmetric square-root Nyquist filter for a symbol rate of 1/2T, i.e. p(t) $\cong$ h(t)*h(t) has zero-crossings spaced 2T. In combination with the frequency offset of 1/4T in (A.2), this ensures ISI-free PAM transmission at symbol rate 1/T, see the explanation for (A.14) and (A.18) later on.

To suppress interchannel interference (ICI), phases $\theta_k$ are introduced in the subchannel modulators as shown in FIGS. 2a-2b. The phase shifts $\theta_k$ are chosen such that adjacent subcarriers have phase differences of $+\pi/2$, a common choice is $$\theta_k=(-1)^k \pi/4. \quad (A.5)$$

This can be interpreted as real-valued PAM modulation on even-numbered subcarriers (k=0,2,4, ... ), and imaginary-valued PAM modulation on odd-numbered subcarriers (k=1, 3,5, ... ). Hence, there will be no interchannel interference (ICI) from adjacent subchannels k±1 at the PAM demodulation in sub channel k, see explanation for (A.18).

Note that the above ICI and ISI considerations hold only in the absence of any signal distortions.

In principle, the CMFB receiver simply reverses the CMFB transmitter operations. The corresponding block diagrams for the continuous time model and the digital implementation follow immediately from FIGS. 2a and 3a. However, such receivers perform well only if the transmission channel is distortionless, e.g. an Additive White Gaussian Noise, AWGN, channel.

Signal distortion by the channel and receiver synchronization errors cause amplitude and phase errors, additional intersymbol interference (IR) between successive CMFB symbols, and additional interchannel interference (ICI) between adjacent subcarriers. To describe these effects, consider FIGS. 2a-2b. Assume that the channel impulse response (CIR) c(t) is known. The impulse response from $s_k$(t) to the output y(t) of the channel is given by the (real part of the) convolution $$\mathcal{R}\left\{h(t)e^{\frac{j\pi t}{2T}} \cdot e^{j\left(2\pi \frac{k}{2T}t+\theta_k\right)} * c(t)\right\} = \mathcal{R}\left\{\int h(\tau)e^{j(2\pi f_k \tau+\theta_k)}c(t-\tau)d\tau\right\}. \quad (A.6)$$

To get more insight, the integral is rewritten as $$\int h(\tau)e^{j(2\pi f_k \tau+\theta_k)}c(t-\tau)d\tau =$$ (A.7)

$$e^{j(2\pi f_k t+\theta_k)}\int h(\tau)\underbrace{e^{-j2\pi f_k(t-\tau)}c(t-\tau)}_{\stackrel{def}{=}c_k(t-\tau)}d\tau ==$$

$$e^{j(2\pi f_k t+\theta_k)}\int h(\tau)c_k(t-\tau)d\tau = e^{j(2\pi f_k t+\theta_k)}h(t)*c_k(t),$$

where $$c_k(t) \stackrel{def}{=} c(t)e^{-j2\pi f_k t} \quad (A.8)$$

is the complex-valued CIR of subchannel k, obtained from down-modulating c(t) by the subcarrier frequency $f_k$. The transfer function of (A.7) is thus $H(f)C(f+f_k)$, as intuitively expected. —At the receiver, the signal is down-modulated by $-k/2T$ and matched filtered. Neglecting terms corresponding to $-f_k$ in (A.6), the overall channel impulse response for the k-th subchannel is therefore $$(A.7) \cdot e^{-j\left(2\pi \frac{k}{2T}t+\theta_k\right)} * h(t)e^{\frac{j\pi t}{2T}} = e^{\frac{j\pi t}{2T}}h(t)*c_k(t)*h(t)e^{\frac{j\pi t}{2T}} = \quad (A.9)$$

$$\ldots == e^{\frac{j\pi t}{2T}}\underbrace{h(t)*c_k(t)*h(t)}_{\stackrel{def}{=}p_k(t)} = e^{\frac{j\pi t}{2T}}p_k(t),$$

where $$p_k(t) \stackrel{def}{=} h(t)*c_k(t)*h(t). \quad (A.10)$$

The corresponding overall channel transfer function is $$H(f)^2 C(f+f_k). \quad (A.11)$$

Given the input signal $s_k$ (t) in (A.1), the output signal (before the sampler at the receiver) is its convolution with the overall channel impulse response (A.9), $$s_k(t)*(A.9) = \quad (A.12)$$

$$\Sigma_m s_k(m)\delta(t-mT) * e^{\frac{j\pi t}{2T}}p_k(t) = \Sigma_m s_k(m)e^{j\frac{\pi}{2T}(t-mT)}p_k(t-mT).$$

Before PAM de-mapping, this continuous-time signal is sampled at times t=mT, resulting in the sequence $$y_k(m) = \Sigma_{m'} s_k(m')e^{j\frac{\pi}{2}(m-m')}\underbrace{p_k(mT-m'T)}_{\stackrel{def}{=}C_k(m-m')} = \Sigma_{m'} s_k(m')C_k(m-m'). \quad (A.13)$$

This can be rewritten in the customary form $$y_k(m)=\Sigma_{i=0}^{L_C-1}C_k(i)s_k(m-i), \quad (A.14)$$

where $C_k(i)$, $i=0 \ldots L_C-1$, is the T-spaced overall channel impulse response of subchannel k. From the definitions of $p_k(\cdot)$ and $C_k(\cdot)$, it is seen that $L_C>0$ if the channel c(t) introduces distortion, i.e. there will be ISI and the channel coefficients $C_k(i)$ will be complex-valued. Note, in the distortionless case ($c_k(t)=\delta(t)$), the impulse responses $p_k(t)$ are all identical, i.e., $=p(t)=h(t)*h(t)$ and have zero-crossings spaced 2T, by the design of h(t). For PAM demodulation, the real part of the T-spaced samples $\mathcal{R}\{y_k(m)\}$ are taken. Since $\mathcal{R}\{\exp(j\pi(m-m')/2)\}=0$ for odd (m-m') in (A.12), this ensures ISI-free transmission at rate 1/T in the distortionless case. This convenient property is in fact due to the design of uniform Cosine Modulated Filter Banks with perfect reconstruction, the theory underlying CMFB modulation.

To model interchannel interference (ICI) from transmitted subchannel k to receiver subchannel k', consider a generalized version of (A.9), $$(A.7) \cdot e^{-j\left(2\pi \frac{k'}{2T}t+\theta_{k'}\right)} * h(t)e^{\frac{j\pi t}{2T}} = \quad (A.15)$$

$$\ldots == e^{j\frac{\pi}{2T}t}\int e^{j\left(2\pi \frac{k-k'}{2T}\tau+(\theta_k-\theta_{k'})\right)}(h*c_k(\tau))h(t-\tau)d\tau =$$

$$\ldots == e^{j\frac{\pi}{2T}t}\underbrace{e^{j\left(2\pi \frac{k-k'}{2T}t+(\theta_k-\theta_{k'})\right)}h(t)*c_k(t)*h(t)}_{\stackrel{def}{=}h_{k-k'}(t)} =$$

$$e^{j\frac{\pi}{2T}t}h_{k-k'}(t)*c_k(t)*h(t).$$

As $h_{k-k'}(t)$ is a modulated version of the low-pass filter h(t), its transfer function is $$H\left(f-\frac{k-k'}{2T}\right),$$

and the overall ICI Transfer function of (A.15) is $$e^{j(\theta_k-\theta_{k'})}H\left(f-\frac{k-k'}{2T}\right)C(f+f_k)H(f). \quad (a.16)$$

Hence ICI depends on the selectivity of the low-pass prototype filter H(f) and the channel transfer function C(f) at $f_k$. Considering $$H\left(f-\frac{k-k'}{2T}\right)$$

in FIGS. 4a-4b, it is seen that only the immediately adjacent subchannels k' with k'=k±1, at $f_{k'}=f_k\pm1/2T$, will be affected by ICI from subchannel k. Similarly to (A.14) one may thus write $$\bar{y}_{k+1}(m)=\Sigma_{i=0}^{L_C-1}\overline{C}_k(i)s_k(m-i) \quad (A.17)$$

$$\underline{y}_{k-1}(m)=\Sigma_{i=0}^{L_C-1}\underline{C}_k(i)s_k(m-i), \quad (A.18)$$

where $\overline{C}_k(i)$ and $\underline{C}_k(i)$ are the sampled "interchannel impulse responses" from subchannel k to subchannel k+1 and k−1, respectively. Note, even in the distortionless case (C(f)≡1), ICI exists since $$H\left(f \pm \frac{1}{2T}\right)\overline{H(f)}$$

in (A.16) and hence $\overline{C}_k$ and $\underline{C}_k$ are non-zero. However, with the choice (A.5), $e^{j(\theta_k - \theta_{k\pm1})} = \pm j$, so that $\overline{C}_k$ and $\underline{C}_k$ become purely imaginary. Using real-valued PAM detection, these ICI terms thus do not affect the data transmission.

Figure 6A:
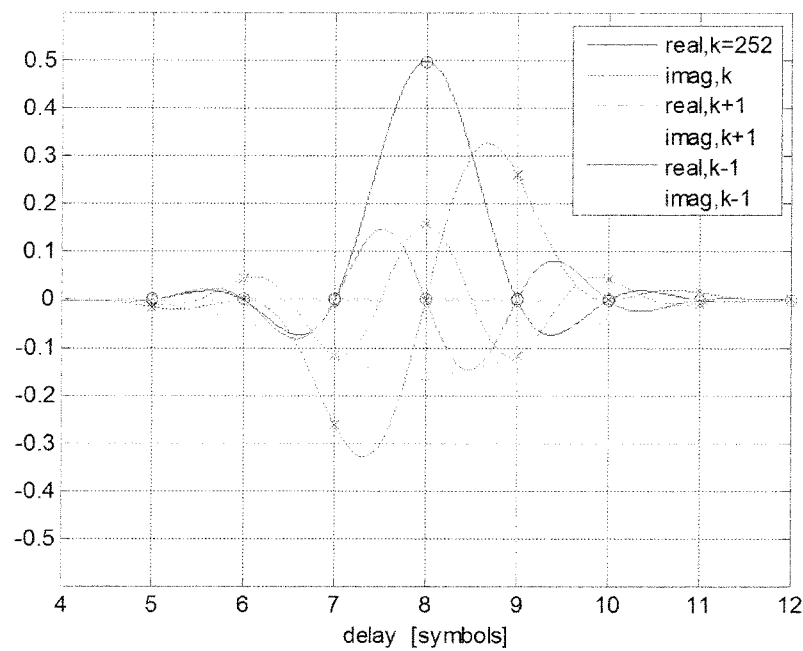
FIGS. 6a-6b shows examples of the CMFB subchannel/interchannel impulse responses, for subchannel k=252 ($f_k$=0.246), where 'o' and 'x' denote real and imaginary parts of the T-spaced samples used for PAM data transmission; in particular.
Figure 6B:
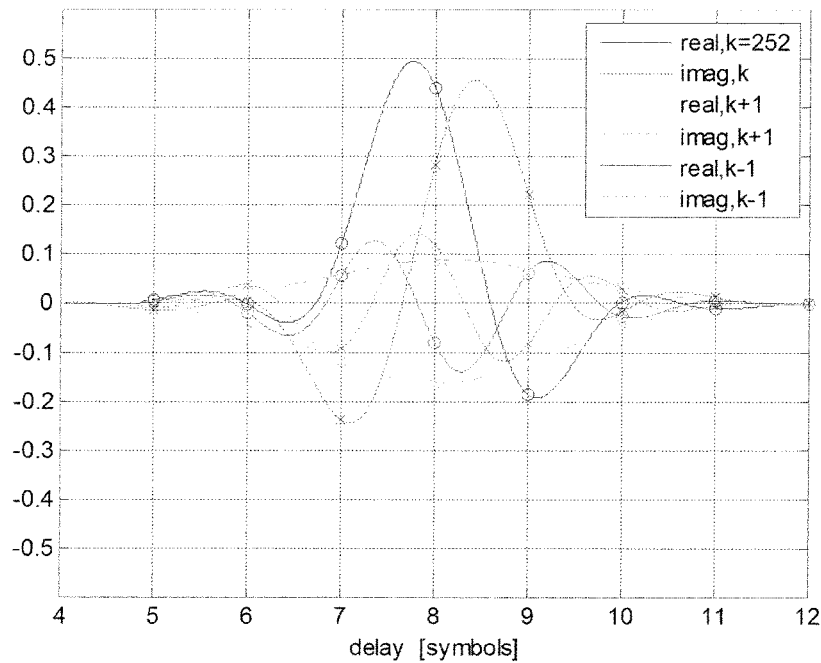
Figure 7A:
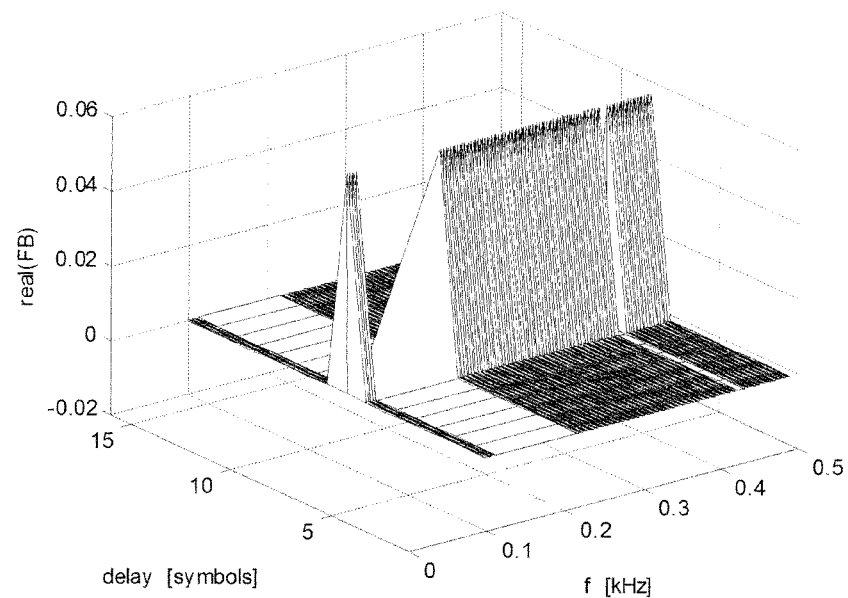
FIGS. 7a-7d shows CMFB impulse responses, as T-spaced filter bank output vectors $y^{(0)}(m)$, where
Figure 7B:
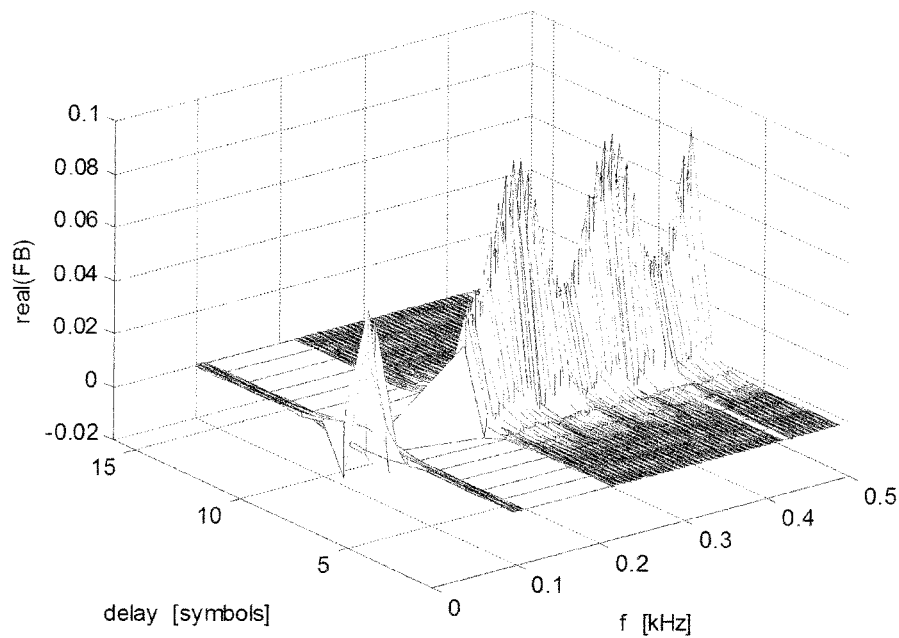
Figure 7C:
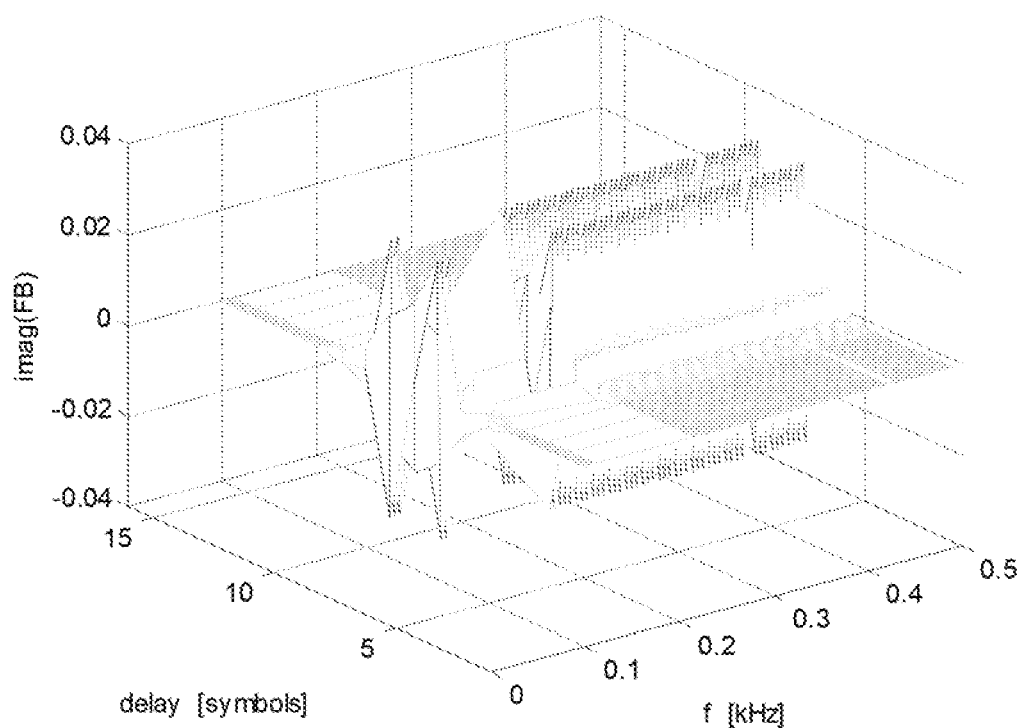
Figure 7D:
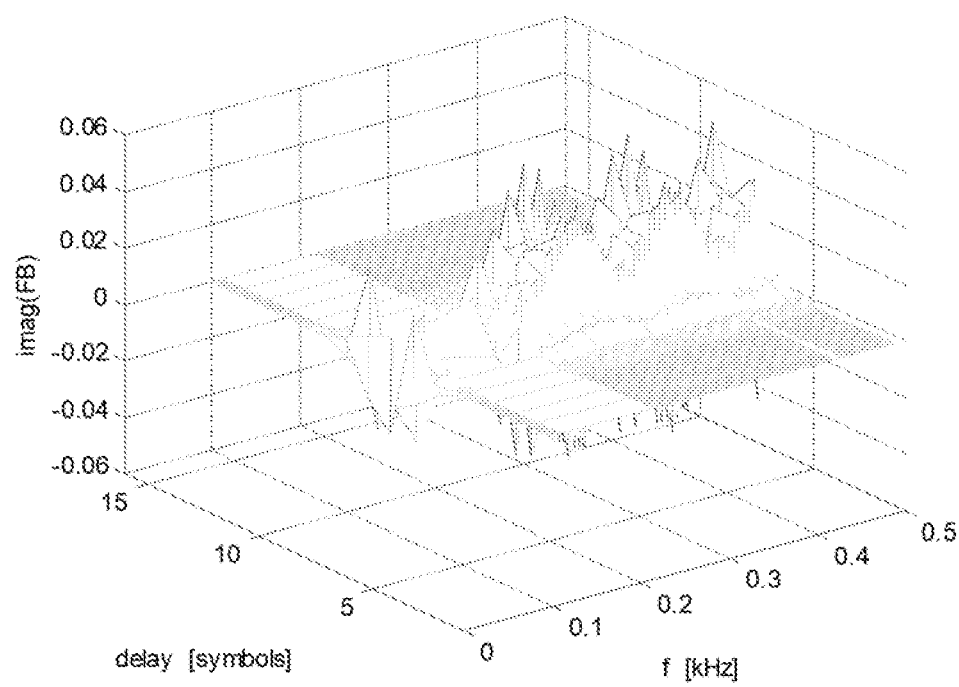

As an example, FIGS. 6a-6b shows a $f_s$-sampled continuous-time subchannel and interchannel impulse responses (A.9) and (A.15), with and without distortion by the transmission channel. FIG. 6a verifies that for T-spaced sampling, there is no ISI and ICI in the real part of the signals in the distortionless case, as predicted in the notes above.

The present invention also introduces matrix notation as follows: define the M-dimensional vectors of the sampled input and output PAM signals, $S(m)=[s_0(m), \ldots s_{M-1}(m)]'$ and $y(m)=[y_0(m), \ldots y_{M-1}(m)]'$. (A.14), (A.17), (A.18) can then be succinctly written as $$y(m) = \sum_{i=0}^{L_C-1} C(i)s(m-i) + n(m). \quad (A.19)$$

where the $L_C$ M×M channel matrices $C(i)$ have a band structure with the 3×1 column vectors $[\underline{C}(i) \; C_k(i), \overline{C}_k(i)]'$ at the k-th position along the diagonal, i.e.

$$C(i) = \begin{bmatrix} \ddots & & & \\ C_{k-1}(i) & \underline{C}_k(i) & 0 & \\ \overline{C}_{k-1}(i) & C_k(i) & \underline{C}_{k+1}(i) & \\ 0 & \overline{C}_k(i) & C_{k+1}(i) & \\ & & & \ddots \end{bmatrix}. \quad (A.20)$$

The representation (A.20) describes the fact that the sample $y_k(m)$ in the receiver subchannel k is a linear combination of $s_{k-1}(m-i)$, $s_k(m-i)$, and $s_{k+1}(m-i)$, i.e. has contributions not only from its own transmitter subchannel k, but also from the adjacent subchannels k−1 and k+1. In (A.19), $n(m)=[\ldots, n_k(m), \ldots]'$ is the vector of modulated and filtered noise samples.

The representation (A.19) has the form of a discrete-time channel model for digital transmission. The scalar form is well-known. (A.19) is a new generalization to matrix form, applicable to CMFB transmission. It is the key to the derivation of the matrix equalizer of this invention, see (C.1).

B. Time Domain Estimation of CIR

The received signal is given by the convolution $y(t)=c(t)*x(t)$, i.e in the discrete-time version, $$y_m = \sum_{i=0}^{L_c-1} c_i x_{m-i} + n_m \quad (B.1)$$

where $\{c_i, i=0 \ldots L_c-1\}$ is the channel impulse response (CIR), and $x_m$ and $n_m$ are the transmitted signal and the noise samples at times $mT_s$, respectively. Note: $c_m = c(mT_s)$, $y_m$, and $x_m$ are time domain samples, sampled at the high sampling rate of $1/T_s$. To aid measurement of the CIR, the transmitter transmits a training signal of $L_x$ known samples $\{x_m\}$. In the presence of noise, the length $L_x$ of this training signal should be much longer than the length $L_c$ of the CIR. From the corresponding received samples $\{y_m\}$, the receiver can then estimate the CIR, e.g. using the well-known least squares criterion, $$\min_{\{c_i\}} \sum_{m=0}^{L_x-1} \left| \sum_{i=0}^{L_c-1} c_i x_{m-i} - y_m \right|^2 = \min_{\{c_i\}} \|Xc - y\|^2, \quad (B.2)$$

where X is a $L_x \times L_c$ matrix containing the samples $\{x_n\}$, and $c=[c_0, \ldots c_{L_c-1}]'$ and $y=[y_0, \ldots y_{L_x-1}]'$ are vectors. The solution of (B.2) is obtained via the Orthogonality Principle, which states that the error $e=Xc-y$ must be orthogonal to X, i.e. $\langle X, e \rangle = 0$, $$X'(Xc-y) \stackrel{!}{=} 0, \quad (B.3)$$

from which $$c = (X'X)^{-1}X'y. \quad (B.4)$$

The $L_c \times L_c$ matrix $X'X$ contains the autocorrelation of the training sequence $x_m$, while the $L_c$-dimensional vector $X'y$ contains the cross-correlations of the received signal $y_m$ with $x_m$. In practice, c is calculated by numerically solving $$(X'X + \gamma I)c = X'y, \quad (B.5)$$

where $\gamma$ is a small number introduced to improve the conditioning of the matrix $X'X$. The conditioning of $X'X$ is given by the spectral properties of the training sequence $x_m$, a narrowband signal $x_m$ results in worse conditioning than a wideband or white signal.

Since $x_m$ is known, the matrix $(X'X+\gamma I)$ can be precalculated and stored in the receiver. At real-time, only the correlation $X'y$ and the solution of (B.5) must be calculated. Further complexity reduction is achieved by using the pre-calculated Cholesky factor of $(X'X+\gamma I)$ to solve (B.5).

C. Determination of Matrix Equalizer

Given the $L_c$ M×M channel matrices $C(i)$, the channel output is a vector $y(m)=[y_0(m), \ldots y_{M-1}(m)]'$, where $y_k(m)$ is the output of the subchannel k at time mT, $$y(m) = \sum_{i=0}^{L_C-1} C(i)S(m-i) + n(m) \quad (C.1)$$

where (m), y(m), s(m), etc., are vector samples at time mT, i.e. sampled at the low CMFB symbol rate 1/T. According to (A.3), $1/T=1/MT_s$, where $1/T_s$ is the high sampling rate of the time domain signal.

The linear equalizer has $L_W$ M×M matrix coefficients $W(i)$. Its output vector is an estimate of the PAM-modulated input vector $S(m)=[s_0(m), \ldots s_{M-1}(m)]'$ to the CMFB modulator, possibly with a delay of $m_0$ CMFB symbols, i.e.

$$\hat{s}(m-m_0) = \sum_{i=0}^{L_W-1} W(i)y(m-i) \quad (C.2)$$

The estimation error vector is $$e(m) \stackrel{\text{def}}{=} \hat{s}(m-m_0) - S(m-m_0) = \sum_{i=0}^{L_W-1} W(i)y(m-i) - S(m-m_0). \quad (C.3)$$

The equalizer optimisation criterion is the minimum mean square error (MMSE) for each component $e_k(m)$ of $e(m)$, $$\min_{\{W(i)\}} E[|e_k(m)|^2] = \min_{\{W(i)\}} E[e_k(m)e_k(m)^*]. \quad (C.4)$$

To determine the equalizer matrices $W(\cdot)$, the present invention extends the well-known method for scalar equalizers. Using matrix notation, the extension from real scalar coefficients to complex matrices is straightforward: Invoke the Orthogonality Principle which states that for MMSE, the error $e_k(m)$ must be orthogonal to the subspace spanned by the measurements $y(m-l)$, $l=0 \ldots L_W-1$, i.e. $\langle e, y \rangle = 0$. Orthogonality is in the covariance sense, and applies to each component of e and y. This can be succinctly written as $$\langle e, y \rangle = E[e(m)y(m-l)^+] \stackrel{!}{=} 0_{M \times M}. \quad (C.5)$$

Inserting (C.3) into (C.5) and using linearity of the expectation operator, $$\sum_{i=0}^{L_W-1} W(i)\underbrace{E[y(m-i)y(m-\ell)^+]}_{=R_{yy}(\ell-i)} = \underbrace{E[s(m-m_0)y(m-\ell)^+]}_{=R_{sy}(\ell-m_0)}, \quad (C.6)$$

$$\sum_{i=0}^{L_W-1} W(i)R_{yy}(\ell-i) = R_{sy}(\ell-m_0), \quad \ell = 0 \ldots L_W - 1 \quad (C.7)$$

where the notation assumes that the random sequences s(·) and y(·) are stationary. Equation (C.7) is a set of linear equations whose solution delivers the MMSE optimum equalizer coefficient matrices W(i).

Note 1: The equalizer output ŝ (m) is complex-valued in general, while the transmitted PAM sequence $s_k$ (m) is real-valued. Hence at the receiver subchannel k, the real part $\mathcal{R}\{s_k(m)\}$ is taken and fed to the PAM detector to recover the transmitted bits.

Note 2: (C.7) is the Wiener-Hopf equation of classical Wiener filtering. The size of (C.7) is $L_W \times M^2$. It can in principle be solved by any linear solver such as Gaussian elimination, which requires $O(L_W^3)$ operations. A more efficient algorithm is however known: Due to the stationarity assumptions on y(·), the matrix $R_{yy}(\cdot)$ is a hermitian block Toeplitz matrix. The so-called block Levinson algorithm is then applicable to solve the Wiener-Hopf equation, using only $O(L_W^2)$ operations.

There remains to express the matrices $R_{yy}(\cdot)$ and $R_{sy}(\cdot)$ in terms of the known channel matrices C(i) and the input and noise statistics. Assume that the input sequence s(·) is uncorrelated in time and between components, i.e. the PAM modulated subchannel signals are i.i.d. with variance $\sigma_s^2$, and uncorrelated to the noise sequence n(·). Then, using (C.1), $$R_{yy}(\ell-i) \stackrel{def}{=} E[y(m-i)y(m-\ell)^+] \quad (C.8)$$
$$= \sum_{i_1}\sum_{i_2} C(i_1)\underbrace{E[s(m-i_1-i)s^+(m-i_2-\ell)]}_{=\sigma_s^2\delta(i+i_1-\ell-i_2)I}C^+(i_2) +$$
$$E[n(m-i)n^+(m-\ell)]$$
$$\boxed{R_{yy}(\ell-i) = \sigma_s^2 \Sigma_{i_1} C(i_1)C^+(i_1+(i-\ell)) + R_n(\ell-i)},$$

and $$R_{sy}(\ell-m_0) \stackrel{def}{=} E[s(m-m_0)y(m-\ell)^+] = \quad (C.9)$$
$$= \sum_{i=0}^{L_C-1} \underbrace{E[s(m-m_0)s(m-i-\ell)^+]}_{=\sigma_s^2\delta(i+i_1-\ell-i_2)I}C^+(i_2)$$
$$\boxed{R_{sy}(\ell-m_0) = \sigma_s^2 C^+(m_0-\ell)}.$$

In (C.8), $R_n(l-i) \stackrel{def}{=} E[n(m-i)n^+(m-l)]$ are the noise covariance matrices. As the noise n(t) enters at the receiver front end, its covariance is determined by its spectrum and by the receiver filter bank, but does not depend on the channel. From FIGS. 2a-2b, the noise in subchannel k is $$n_k(t) = n(t)e^{-j\left(2\pi\frac{k}{2T}t+\theta_k\right)} * h(t)e^{\frac{j\pi t}{2T}} = \quad (C.10)$$
$$\int n(\tau)e^{-j\left(2\pi\frac{k}{2T}\tau+\theta_k\right)}h(t-\tau)e^{j\frac{\pi}{2T}(t-\tau)}d\tau.$$

Assuming white noise n(t) with $E[n(t_1)n(t_2)]=\sigma_n^2\delta(t_1-t_2)$, the covariance between the noise signals in subchannels k and k' becomes $$E[n_k(t_1)n_{k'}^*(t_2)] = \ldots = = \sigma_n^2 e^{-j2\pi\frac{k-k'}{2T}t_1} e^{-j\frac{\pi}{2T}(t_1-t_2)} \quad (C.11)$$
$$\int \underbrace{e^{j\left(2\pi\frac{k-k'}{2T}\tau-(\theta_k-\theta_{k'})\right)}h(\tau)h(t_1-t_2-\tau)d\tau}_{=h_{k-k'}(\tau)\exp(-j2(\theta_k-\theta_{k'}))} ==$$
$$\sigma_n^2 e^{-j2\pi\frac{k-k'}{2T}t_1} e^{-j\frac{\pi}{2T}(t_1-t_2)} e^{-j2(\theta_k-\theta_{k'})} h_{k-k'} * h(t_1-t_2),$$

where the interchannel impulse response $h_{k-k'}(t)$ was defined in (A.15). Note that the factor exp(−j2π(k−k')$t_1$/2T) implies that the interchannel cross-correlation of the noise depends on absolute time $t_1$, although the noise n(t) is assumed to be stationary, i.e. its autocorrelation depends only on the time difference $t_1-t_2$. From the discussion of (A.16), the main contribution of this non-stationarity noise is given by $$H\left(f \pm \frac{1}{2T}\right)H(f),$$

which is typically small and will thus be neglected in the following. Thus only the noise correlation within each subchannel k=k' is considered. Using (C.11), the correlation of the noise samples at $t_1=(m-i)T$ and $t_2=(m-l)T$ is $$E[n_k((m-i)T)n_k^*((m-\ell)T)] = \sigma_n^2 e^{-j\frac{\pi}{2}(\ell-i)} p((\ell-i)T), \quad (C.12)$$

where p(t)=h(t)*h(t) is a Nyquist pulse with 2T-spaced zeros. Since this correlation does not depend on the subchannel index k, the matrices $R_n(l-i)$ in (C.8) become $$\boxed{R_n(\ell-i) = \sigma_n^2 e^{-j\frac{\pi}{2}(\ell-i)} p((\ell-i)T) \cdot I} \quad (C.13)$$

where I is the M×M unit matrix. $R_n(l-i)$ are given by the CMFB transmitter h(t) and can thus be precalculated, possibly up to the factor $\sigma_n^2$, while $R_{yy}(l-i)$ and $R_{sy}(l-i)$ require knowledge of the CIR c(t). Given these matrices, (C.7) is solved to obtain the matrix equalizer coefficients W(i).

While the invention has been described in detail in the drawings and foregoing description, such description is to be considered illustrative or exemplary and not restrictive. Variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain elements or steps are recited in distinct claims does not indicate that a combination of these elements or steps cannot be used to advantage, specifically, in addition to the actual claim dependency, any further meaningful claim combination shall be considered disclosed.

The invention claimed is:

1. A method for receiving a signal carrying digital data by a receiver, wherein the signal is modulated using a Cosine Modulated Filter Bank CMFB at a sender and transmitted through a transmission channel having a channel impulse response c(t), comprising the steps of:
- a) determining the channel impulse response c(t) in time domain,
- b) mapping the channel impulse response c(t) to a discrete-time matrix channel impulse response C(i) in order to obtain the discrete-time matrix channel impulse response C(i),
- c) determining matrix coefficients W(i) based on a linear system of equations using the discrete-time matrix channel impulse response C(i) and statistical parameters of the digital signal, and
- d) equalizing the signal at the receiver using the matrix coefficients W(i) in order to reduce signal distortion introduced by the transmission channel, wherein the method further comprises:
- (i) performing convolution of a predefined excitation signal with the channel impulse response c(t),
- (ii) feeding the convolution signal to an implementation of a CMFB at the receiver, and
- (iii) mapping CMFB output vectors y(m) to the discrete-time matrix channel impulse response.

2. The method according to claim 1 further comprising the step of:
- e) demapping the digital data from the equalized signal.

3. The method according to claim 2, wherein the step e) is performed by demapping the digital data from a vector of complex-valued samples of the equalized signal.

4. The method according to claim 1, wherein the signal is modulated by the CMFB according to:

$$y(m) = \sum_{i=0}^{L_C-1} C(i)s(m-i) + n(m)$$

where y(m) is CMFB output vectors sequence, the vector s(m) contains data-modulated samples of M sub-channels of the CMFB modulation, n(m) is a vector of noise samples, and m is the count of CMFB symbols.

5. The method according to claim 4, wherein equalizing in step d) is structured as:

$$\hat{s}(m - m_0) = \sum_{i=0}^{L_W-1} W(i)y(m-i)$$

where the vector $\hat{s}$ contains the samples of the M sub-channels of the equalizer, m is the count of the CMFB symbols, $m_0$ is delay of the equalizing step c), $L_w$ is number of matrix coefficients W(i), and matrix coefficients W(i) have a dimension of M×M and depend on the channel impulse response c(t) and CMFB modulation parameters such as h(t).

6. The method according to claim 1, wherein the matrix coefficients W(i) obtained in step c) is according to:

$$\Sigma_{i=0}^{L_W-1} W(i)R_{yy}(l-i) = R_{sy}(l-m_0),\ l=0\ldots L_W-1$$

where $R_{yy}(\ )$ are correlation matrices of the CMFB output vectors sequence y(m), $R_{sy}(\ )$ are the cross-correlation matrices between vector sequences y and s.

7. The method according to claim 1, wherein the step b) is performed using the predefined excitation signal including multiple time domain transmission signals $x^{(r)}(t)$.

8. The method according to claim 7, wherein the implementation is poly-phase.

9. The method according to claim 2, wherein the steps a) to c) are performed in a training state, while the step d) and e) are performed in a steady-state during the transmission of the signal.

10. A matrix equalizer at a receiver for equalizing a modulated signal carrying digital data, wherein the signal is modulated using a Cosine Modulated Filter Bank CMFB at a sender and transmitted through a transmission channel having a channel impulse response c(t), wherein the matrix equalizer is configured to:
- determine the matrix channel impulse response c(t) in the time domain,
- map the channel impulse response c(t) to a discrete-time matrix channel impulse response C(i), in order to obtain the discrete-time matrix channel impulse response C(i),
- determine matrix coefficients W(i) based on a linear system of equations using the discrete-time matrix channel impulse response C(i) and statistical parameters of the digital signal, and equalize the modulated signal using the matrix coefficients W(i) in order to reduce signal distortion introduced by the transmission channel, and wherein the matrix equalizer is further configured to:
- perform convolution of a predefined excitation signal with the channel impulse response c(t),
- feed the convolution signal to an implementation of a CMFB at the receiver, and
- map CMFB output vectors y(m) to the discrete-time matrix channel impulse response.

11. The matrix equalizer according to claim 10, being structured as:

$$\hat{s}(m - m_0) = \sum_{i=0}^{L_W-1} W(i)y(m-i)$$

where the vector $\hat{s}$ contains the samples of the M sub-channels of the equalizer, m is the count of the CMFB symbols, $m_0$ is delay of the equalizing, $L_w$ is number of matrix coefficients W(i), and wherein the matrix coefficients W(i) have a dimension of M×M and depend on the channel impulse response c(t) and CMFB modulation parameters.

12. The matrix equalizer according to claim 10, wherein the matrix coefficients W(i) are obtained according to:

$$\Sigma_{i=0}^{L_W-1} W(i)R_{yy}(l-i) = R_{sy}(l-m_0),\ l=0\ldots L_W-1$$

where $R_{yy}(\ )$ are correlation matrices of the CMFB output vectors sequence y(m), $R_{sy}(\ )$ are the cross-correlation matrices between vector sequences y and s.

13. The matrix equalizer according to claim 10, is configured to:
- map the channel impulse response c(t) to the discrete-time matrix channel impulse response C(i) using the predefined excitation signal including multiple time domain transmission signals $x^{(r)}(t)$.

14. The matrix equalizer according to 13, wherein the implementation is poly-phase.

15. The matrix equalizer according claim 10, is configured to:
- demapping the digital data from of a vector of complex-valued samples the equalized signal.

16. The method according to claim 2, wherein the signal is modulated by the CMFB according to:

$$y(m) = \sum_{i=0}^{L_C-1} C(i)s(m-i) + n(m)$$

where y(m) is CMFB output vectors sequence, the vector s(m) contains data-modulated samples of M sub-channels of the CMFB modulation, n(m) is a vector of noise samples, and m is the count of CMFB symbols.

17. The method according to claim 3, wherein the signal is modulated by the CMFB according to:

$$y(m) = \sum_{i=0}^{L_C-1} C(i)s(m-i) + n(m)$$

where y(m) is CMFB output vectors sequence, the vector s(m) contains data-modulated samples of M sub-channels of the CMFB modulation, n(m) is a vector of noise samples, and m is the count of CMFB symbols.

18. The matrix equalizer according to claim 11, is configured to:
map the channel impulse response c(t) to the discrete-time matrix channel impulse response C(i) using a predefined excitation signal including multiple time domain transmission signals $x^{(r)}(t)$.

19. The matrix equalizer according to 18, is configured to:
perform convolution of the predefined excitation signal with the channel impulse response c(t),
feed the convolution signal to an implementation of a CMFB at the receiver, wherein the implementation is preferably poly-phase, and
map CMFB output vectors y(m) to the discrete-time matrix channel impulse response.

20. The matrix equalizer according to claim 12, is configured to:
map the channel impulse response c(t) to the discrete-time matrix channel impulse response C(i) using a predefined excitation signal including multiple time domain transmission signals $x^{(r)}(t)$.

21. The method according to claim 1, wherein the matrix coefficients W(i) are minimum mean square error, MMSE, optimum.

22. The matrix equalizer according to claim 10, wherein the matrix coefficients W(i) are minimum mean square error, MMSE, optimum.

* * * * *